April 20, 1926.

A. O. AUSTIN 1,581,154

TRANSMISSION LINE

Filed Dec. 6, 1920   2 Sheets-Sheet 1

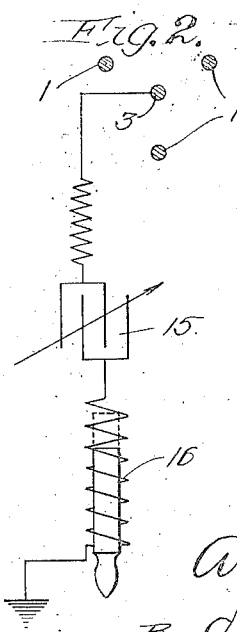

Patented Apr. 20, 1926.

1,581,154

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

TRANSMISSION LINE.

Application filed December 6, 1920. Serial No. 428,439.

*To all whom it may concern:*

Be it known that I, ARTHUR O. AUSTIN, a citizen of the United States, residing at Barberton, in the county of Summit and State of Ohio, have invented certain new and useful Improvements in Transmission Lines, of which the following is a specification.

This invention relates to transmission line construction, and especially to high voltage lines, and has for its object the provision of a structure of the class named which shall be of approved construction and operation.

The invention is exemplified in the combination and arrangement of parts shown in the accompanying drawings and described in the following specification, and it is more particularly pointed out in the appended claims.

In the drawings—

Fig. 2 is a diagrammatic cross-sectional view of a transmission line showing one arrangement of parts contemplated by the invention.

Figure 1:
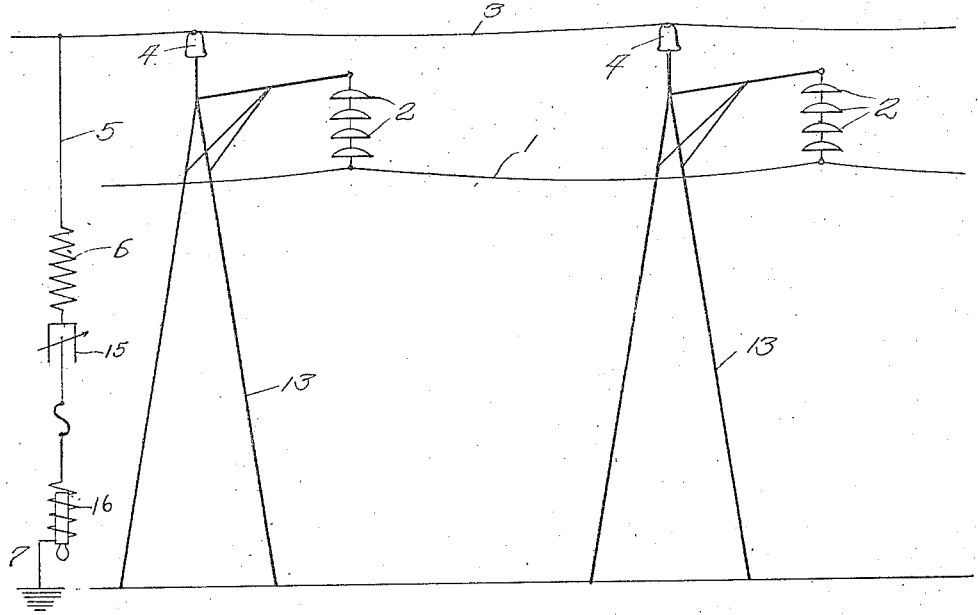
Fig. 1 is a diagrammatic view illustrating one form of the present invention.

In a transmission system the combination of reactance and capacity between conductors or between conductors and ground frequently permit destructive voltage rises due to resonance. The danger of resonance in general increases with the length of the system as the natural or resonant period of the system becomes lower and may correspond to some harmonic or multiple of some harmonic on the system. The harmonic may produce dangerous rises of voltage only occasionally. It is the accumulative effect of the small increments of energy represented by the harmonics that usually produces the dangerous rise in potential. If the energy represented by these small increments can be sufficiently absorbed the magnitude of the oscillation in the system may be kept down or damped out. It is the purpose of this application to provide means or arrangement of apparatus so that this damping may be effected economically.

In Fig. 1 is shown a transmission system with conductors 1 suspended by insulators 2 which are hung from towers 13. In most systems a ground wire 3 is supported on the towers above the conductors. It is proposed to insulate the ground wire or conductor 3 by insulators 4. This ground wire or conductor may run throughout the length of the system and be transposed to give some desired relation to the conductors, or, it may be split up into short sections. In general it will probably be found advisable to run a tap 5 from the ground wire 3 to the ground 7. This tap may lead the flow of current between conductor 3 and earth or ground through a resistance 6. The conductors 1 and 3 constitute the elements of a condenser so that when electrical vibrations occur in the wire 1, corresponding vibrations will be inducted in the wire 3, tending to cause flow of current to ground through resistance 6. This flow of current will, of course, entail loss of energy, and thus produce a damping action on the vibration in the circuit 3. If the static induction or damping wire 3 is of such size as to give the proper resistance the tap 5 and resistance 6 may be dispensed with and the conductors grounded on the tower at proper intervals. In most cases, however, it is preferable to provide additional resistance in series with the damping wire as otherwise, to provide sufficient resistance, the wire would have to be too small for proper mechanical strength. A circuit breaker which may be a fuse, an overload cut-out, a switch or other suitable device, may be inserted in the ground connection to disconnect the conductor 3 from ground in case of a short between the wires 1 and 3. When the circuit breaker is open the transmission line may continue in use even if it is shorted on the conductor 3.

The main conductor 1 forms one side of the condenser, while the insulated damping wire 3 forms the other side. The flow of current through the resistance 6 will be directly proportional to the voltage between conductors 1 and 3. At normal frequency the static induction causes a relatively small current to flow and the induced voltage is largely taken up by the condenser formed by the parts 1 and 3, and the energy consumed in the resistance 6 is small. The energy absorbed will be the equivalent to the square of the current flowing times the resistance 6. Since the current flowing will go up approximately as the product of the frequency and the voltage, the energy absorbed by the resistance 6 will vary approximately as the square of the product of the frequency and voltage.

If conditions were such that there was a loss of 1 k. w. in resistance 6 at normal frequency a harmonic which increased the frequency five times would increase the loss twenty-five times, providing the maximum voltage was the same. As high frequencies, however, are usually attended by increase in voltage, it may be easily assumed that the voltage will be double or treble normal voltage. If the normal voltage was doubled, this would increase the loss in resistance 6 approximately four times, or, the total loss from both frequency and rising voltage would be one hundred times that at the normal frequency. This increase in energy consumption would tend to damp out high frequency surges and would prevent them reaching a dangerous magnitude. Since the energy loss increases approximately as the square of the frequency, a small electrostatic capacity between conductors 3 and 1 may be used to damp out surges, providing the frequency is sufficiently high.

Under some conditions it may be possible to use a reactance coil of proper size between the conductor 3 and ground. By properly proportioning the reactance and capacity the combination may be given any natural period. This period may be some multiple of the harmonic occurring on the conductor 1, or, some multiple of the natural period or frequency which may cause trouble on the main conductor 1. With this arrangement resistance 6 would absorb more energy and in turn the arrangement might be used to impress the higher frequency on the main conductor. This higher frequency would produce greater losses in the ground or objects near the main conductor which would tend to absorb more energy so that dangerous rises would not occur.

Existing systems provided with ground wires might be readily changed and equipped throughout their entire length or in sections only where the efficiency of the arrangement would be greatest. It is evident that the values of capacity and reactance, as well as resistance 6, might be varied within wide limits to obtain the most efficient results, and furthermore, they might vary at different points in the system. It is also evident that the general arrangement may be used between conductors as well as between conductor and ground.

There are many other arrangements of reactance and capacity which may be used to accomplish the same result, the general principle, however, being the same.

Where the transmission line to be protected against high frequency disturbances comprises a polyphase circuit the induction damping wire may be arranged relative to the conductors of the transmission circuit so that it will lie in a neutral field as relates to the normal potential of the transmission system. Such an arrangement is shown diagrammatically in Fig. 2, in which the numeral 1 designates the three conductors of a three-phase circuit, and the numeral 3 designates the damping conductor. Where the conductors 1 are arranged in the form of an equilateral triangle the conductor 3 may be arranged at a point equidistant from the three conductors 1. The neutral position in which the conductor 3 is placed will, of course, vary according to the relative position of the three conductors 1. With an arrangement such as this there will be substantially no current induced in the conductor 3 during the normal operation of the line, but if abnormal vibrations are impressed upon the circuit as a whole, such vibrations will induce current in the conductor 3, which will lead through the resistance 6 to ground at 7. This will produce a damping effect upon the abnormal vibrations and tend to prevent damage resulting from such abnormal surges in the circuit.

It may sometimes be desirable to adjust the capacity or reactance in the line or to insert an adjustable condenser 15 and an adjustable inductance 16 in the circuit by means of which the natural resonant period of the damping circuit may be regulated to correspond to any particular disturbance that the transmission circuit is subject to so that when such a disturbance is impinged upon the line the damping effect of the circuit 3 will be augmented, due to the fact that it corresponds or bears some suitable relation to the natural resonant period to the vibrations creating a disturbance.

I claim:—

1. The combination with an electrical transmission line, of a conductor arranged in proximity thereto and substantially paralleling a series portion of said line and insulated therefrom so as to form with said transmission line the elements of a condenser, said conductor having connection through substantial resistance to ground in addition to the resistance of said conductor so that a comparatively large amount of energy will be absorbed in said resistance when currents are induced in said conductor by abnormal high frequencies or voltages in said transmission circuit and a condenser interposed between said conductor and ground in series with said resistance so as to provide a break in said circuit but to permit passage of high frequency currents.

2. The combination with a transmission circuit comprising a conductor, of supports for said conductor, insulators for sustaining said conductor on said supports, a secondary conductor insulators for sustaining said secondary conductor on said supports and insulated from the conductor of said transmission circuit, means for maintaining said conductors in substantially fixed relation to one another, and means for connecting said secondary conductor in series through a condenser and substantial resistance to ground in addition to the resistance of said conductor so that abnormal surges in the conductor of said transmission line will induce currents in said secondary and cause the absorption of energy in said resistance thus effecting a damping of the surges in said transmission line.

3. The combination with a transmission line, of an inductive circuit comprising a conductor arranged in inductive relation to said transmission line and insulated therefrom, and means for regulating the resonant period of said inductive circuit to correspond to the frequency of an abnormal disturbance on said transmission circuit for damping said abnormal disturbance.

4. The combination with a transmission line, of a conductor arranged in inductive relation thereto and insulated therefrom, said conductor forming a part of a circuit to ground comprising both capacity and inductance adjustable relative to one another to regulate the normal resonant period of said conductor circuit.

5. The combination with a transmission line subject to an abnormal high frequency disturbance, of a supplementary conductor arranged in inductive relation with said transmission line and insulated therefrom, said conductor comprising a circuit to ground having capacity and inductance therein adjustable relative to one another for regulating the normal resonant period of said supplementary circuit to cause said period to correspond to a high frequency disturbance to which said transmission circuit is subjected so that such a disturbance on said transmission circuit will be damped by the absorption of energy of the current induced in said supplementary conductor circuit.

6. The combination with a transmission line, of supporting towers therefor, series insulators for suspending said transmission line from said supporting towers, a supplementary conductor carried by said towers, and insulated from said towers and transmission line and insulators for maintaining said transmission line and supplementary conductor in substantially fixed relation to one another, said supplementary conductor having connection through resistance to ground in addition to the resistance of the conductor for absorption of energy of induced currents in said supplementary conductor due to high frequency disturbances in said transmission line and a condenser interposed between said supplementary conductor and ground in series with said resistance.

7. The combination with a high potential transmission line of supports for said line, insulators for connecting said line with said supports, an auxiliary conductor paralleling said transmission line through substantially the length thereof, said auxiliary conductor being mounted on said supports and insulated from said supports and said transmission line, and an energy absorbing circuit connecting said auxiliary conductor to ground, said circuit including a resistance member in series therewith of sufficient resistance in addition to the resistance of said auxiliary conductor to materially increase the resistance to a current flowing in said auxiliary conductor to ground and a condenser in series with said circuit and resistance.

8. The combination with a high potential transmission line of supports for said line, insulators for connecting said line to said supports, an auxiliary conductor carried by said supports and extending along said transmission line in inductive relation thereto, said auxiliary conductor being insulated from said supports and said transmission line, a conductor for connecting said auxiliary conductor to ground, there being material resistance interposed between said auxiliary conductor and ground, and means associated with said ground connecting conductor for adjusting the natural period of vibration of said auxiliary conductor.

9. The combination with a transmission line, of a supplementary conductor substantially paralleling a portion of said line and insulated therefrom, insulators for supporting said supplementary conductor, and means for conducting high frequency disturbances from said supplementary conductor to ground, said conducting means comprising a circuit having a resistance and a condenser in series therein, the condenser serving to open said circuit with respect to direct currents and to provide a substantially open circuit for power currents of normal frequency.

10. The combination with a transmission line, of supports for said line, insulators on said supports for carrying said line, a supplementary conductor mounted on said supports and insulated from said supports and transmission line, and means for conducting high frequency disturbances from said supplementary conductor to ground, said conducting means comprising a circuit having a resistance therein in addition to the resistance of said transmission line, inductance in series with said resistance, and a condenser in series with said resistance and inductance, said condenser forming a break in the continuity of the conducting material of said circuit.

11. The combination with a transmission line, of supports for said line, insulators on said supports for carrying said line, a supplementary conductor mounted on said supports and insulated from said supports and transmission line, and means for conducting high frequency disturbances from said supplementary conductor to ground, said conducting means comprising a circuit having a resistance therein in addition to the resistance of said transmission line, inductance in series with said resistance, and a condenser in series with said resistance and inductance, said condenser forming a break in the continuity of the conducting material of said circuit, said condenser and inductance being variable to permit change in the normal resonance period of said supplementary conductor.

In testimony whereof I have signed my name to this specification on this 30th day of November, A. D. 1920.

ARTHUR O. AUSTIN.